(12) United States Patent
Liu et al.

(10) Patent No.: US 9,009,571 B2
(45) Date of Patent: Apr. 14, 2015

(54) STORAGE MEDIUM, SYSTEM AND METHOD UTILIZING THE SAME

(71) Applicant: Silicon Motion, Inc., Jhubei, Hsinchu County (TW)

(72) Inventors: Cheng-Wei Liu, Taichung (TW); Hsu-Ping Ou, Zhubei (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 58 days.

(21) Appl. No.: 13/947,979

(22) Filed: Jul. 22, 2013

(65) Prior Publication Data

US 2014/0136929 A1    May 15, 2014

(30) Foreign Application Priority Data

Nov. 12, 2012 (TW) .............................. 101141990 A (51) Int. Cl.
   *G11C 29/00* (2006.01)
   *G06F 11/10* (2006.01)
(52) U.S. Cl.
   CPC .................................. *G06F 11/1048* (2013.01)
(58) Field of Classification Search
   CPC . G06F 11/1044; G06F 11/1666; G06F 11/20; G06F 11/1048; G06F 11/1008; G06F 11/141; G06F 11/10; G06F 11/167; G06F 11/2056; G11C 2029/0409; G11C 5/04; G11C 29/52
   See application file for complete search history.

(56) References Cited

U.S. PATENT DOCUMENTS

| | | | |
|---|---|---|---|
| 8,250,436 B2 * | 8/2012 | Hinz et al. ................... | 714/763 |
| 8,386,905 B2 | 2/2013 | Chu | |
| 8,572,455 B2 * | 10/2013 | Blackmon et al. ........... | 714/754 |
| 2006/0212656 A1 | 9/2006 | Ueki et al. | |
| 2006/0288177 A1 * | 12/2006 | Shaw ............................ | 711/162 |
| 2007/0255999 A1 * | 11/2007 | Risse ............................ | 714/766 |
| 2008/0010435 A1 * | 1/2008 | Smith et al. .................. | 712/10 |
| 2011/0047440 A1 * | 2/2011 | Blackmon et al. ........... | 714/764 |
| 2012/0110414 A1 * | 5/2012 | Hinz et al. ................... | 714/763 |

FOREIGN PATENT DOCUMENTS

TW        201133498        10/2011

OTHER PUBLICATIONS

English language machine translation of TW 201133498 (published Oct. 11, 2011).

* cited by examiner

*Primary Examiner* — Guerrier Merant
(74) *Attorney, Agent, or Firm* — McClure, Qualey & Rodack, LLP (57) ABSTRACT

A storage medium receiving write data provided by a host device, providing read data to the host and including a first module and a second module is disclosed. The first module includes a first memory cell and a first controller. The first memory cell stores the write data. The first controller reads the first memory cell to generate a first accessing result. The second module includes a second memory cell and a second controller. The second memory cell stores the write data. The second controller reads the second memory cell. When the first accessing result has an error and the error cannot be corrected by the first controller, the first controller requests the second controller to read the second memory cell to generate a second accessing result, and the second controller serves the second accessing result as the read data and provides the read data to the host.

16 Claims, 6 Drawing Sheets

STORAGE MEDIUM, SYSTEM AND METHOD UTILIZING THE SAME

CROSS REFERENCE TO RELATED APPLICATIONS

This Application claims priority of Taiwan Patent Application No. 101141990, filed on Nov. 12, 2012, the entirety of which is incorporated by reference herein.

BACKGROUND OF THE INVENTION

1. Field of the Invention

The invention relates to an access system, and more particularly to an access system comprising a plurality of storing modules.

2. Description of the Related Art

A NAND flash memory is a commonly used storage medium and widely used in electronic products. NAND flash memories can be manufactured into memory cards or USB disks. The flash memory cards comprise Compact Flash (CF) cards, Multi Media Cards (MMCs), an embedded MultiMediaCards (eMMCs), a Smart Media (SM) cards, and a Secured Digital (SD) cards.

However, when a flash memory card is abnormal, the flash memory card cannot communicate with a host. For example, when the flash memory card executes an Error Checking and Correcting (ECC) operation, if the operation fails to correct the errors, the host device cannot receive correction data from the flash memory card during a read cycle.

BRIEF SUMMARY OF THE INVENTION

In accordance with an embodiment, a storage medium receives write data provided by a host device, provides read data to the host and comprises a first module and a second module. The first module comprises a first memory cell and a first controller. The first memory cell stores the write data. The first controller reads the first memory cell to generate a first accessing result. The second module comprises a second memory cell and a second controller. The second memory cell stores the write data. The second controller reads the second memory cell. When the first accessing result has an error and the error cannot be corrected by the first controller, the first controller requests the second controller to read the second memory cell to generate a second accessing result, and the second controller serves the second accessing result as the read data and provides the read data to the host.

In accordance with another embodiment, an access system comprises a host device and a storage medium. The host device provides write data or receives read data. The storage medium communicates with the host device and comprises a first module and a second module. The first module comprises a first memory cell and a first controller. The first memory cell stores the write data. The first controller reads the first memory cell to generate a first accessing result. The second module comprises a second memory cell and a second controller. The second memory cell stores the write data. The second controller reads the second memory cell. When the first accessing result has an error and the error cannot be corrected by the first controller, the first controller requests the second controller to read the second memory cell to generate a second accessing result, and the second controller serves the second accessing result as the read data and provides the read data to the host device.

An access method for a storage medium is provided. The storage medium comprises a first module and a second module. The first module comprises a first controller and a first memory cell. The second module comprises a second controller and a second memory cell. An exemplary embodiment of the access method for the storage medium is described in the following. The first controller is activated to receive a read command. The first memory cell is read to generate a first accessing result according to the read command. The second controller is requested by the first controller to read the second memory cell to generate a second accessing result and serves the second accessing result as read data when the first accessing result has an error and the error cannot be corrected. The read data is provided to a host device.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
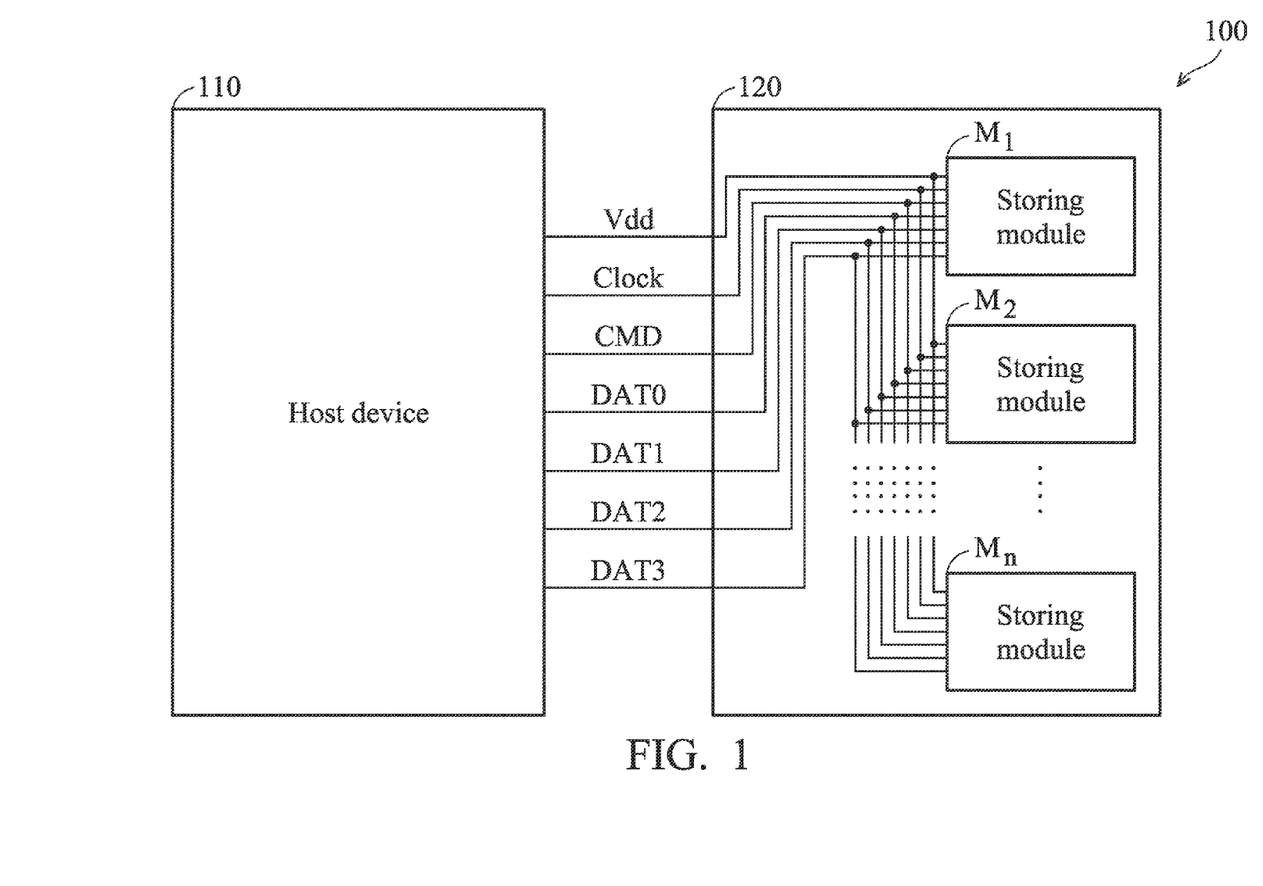
FIG. 1 is a schematic diagram of an exemplary embodiment of an access system of the invention.

FIG. 1 is a schematic diagram of an exemplary embodiment of an access system of the invention. The access system 100 comprises a host device 110 and a storage medium 120. The host device 110 writes data to the storage medium 120 or reads data from the storage medium 120.

The invention does not limit the kind of the storage medium 120. Any device can serve as the storage medium 120, as long as the device has a storing function. In this embodiment, the storage medium 120 is a Secure Digital (SD) card and communicates with the host device 110 according to an SD protocol. As shown in FIG. 1, in the SD protocol, a plurality of transmittal lines Vdd, Clock, CMD, DAT0~DAT3 are utilized. In other embodiments, the storage medium 120 is an embedded MultiMediaCard (eMMC).

In this embodiment, the storage medium 120 comprises storing modules $M_1$~$M_n$. The invention does not limit the kinds of the storing modules $M_1$~$M_n$. In one embodiment, the storing modules $M_1$~$M_n$ are micro SD cards. Each of the storing modules $M_1$~$M_n$ comprises a card identification number and the card identification numbers are different. One of the storing modules $M_1$~$M_n$ is served as a main module and the others are served as sub-modules according to the card identification numbers.

For example, assuming that the card identification number of the storing module $M_1$ serving as a main module is set to 0, the card identification numbers of the storing modules $M_2$~$M_n$ serving as sub-modules are set to other numbers, which exceed that of the storing module $M_1$.

During an initiate cycle, the host device 110 determines whether the storage medium 120 is ready. Since the storing module $M_1$ is served as a main module, the storing module $M_1$ provides a response signal to the host device 110 after all of the storing modules $M_1 \sim M_n$ are ready. In this embodiment, the storing module $M_1$ utilizes at least one transmittal line to determine whether the storing modules $M_2 \sim M_n$ are ready. Taking the SD protocol as an example, the storing module $M_1$ communicates with the storing modules $M_2 \sim M_n$ via the transmittal lines DAT1 and DAT2.

When one of the storing modules $M_1 \sim M_n$ is not ready, the storing module $M_1$ provides an unready response to the host device 110. The host device 110 sends an ask command again until the storing module $M_1$ provides a read response. In one embodiment, when the storing modules $M_1 \sim M_n$ are ready, the storing module $M_1$ sets the level of the transmittal line DAT0 to a low level. The host device 110 determines that the storage medium 120 is ready according to the level of the transmittal line DAT0.

During a write cycle, the host device 110 transmits write data to the storage medium 120. After all modules store the write data, the storing module $M_1$ provides a response signal to the host device 110. In one embodiment, when one of the storing modules $M_1 \sim M_n$ does not store the write data, the storing module $M_1$ sets the level of the transmittal line DAT0 to the low level.

During a read cycle, the storing module $M_1$ reads data, which is stored in the storing module $M_1$ to generate a first accessing result according to address information and executes an Error Checking and Correcting (ECC) operation for the first accessing result. When the first accessing result does not have an error or the first accessing result has an error and the error can be corrected, the storing module $M_1$ corrects the first accessing result to generate corrected data, serves the corrected data as read data and provides the read data to the host device 110 via the transmittal lines DAT0~DAT3. In one embodiment, when the storing module $M_1$ sets each of the levels of the transmittal lines DAT0~DAT3 to the low level, the host device 110 determines that the storage medium 120 is ready to provide read data.

However, when many incorrect bits occur in the first accessing result, the first accessing result cannot be corrected. Thus, the storing module $M_1$ requests one of the storing modules $M_2 \sim M_n$ to serve as a new main module. In one embodiment, if the card identification number of the storing module $M_2$ is less than each of the card identification numbers of the storing modules $M_3 \sim M_n$, the storing module $M_2$ is served as the new main module.

The storing module $M_2$ reads data, which is stored in the storing module $M_2$ to generate a second accessing result and executes an ECC operation for the second accessing result. When the second accessing result does not have an error or the second accessing result has an error and the error can be corrected, the storing module $M_2$ corrects the second accessing result to generate corrected data, serves the corrected data as read data and provides the read data to the host device 110 via the transmittal lines DAT0~DAT3. At this time, the storing module $M_2$ sets each level of the transmittal lines DAT0~DAT3 to the low level to represent that the read data is ready.

In one embodiment, when the storing module $M_1$ requests the storing module $M_2$ to provide the read data to the host device 110, the storing module $M_2$ serves as a main module. At this time, the storing module $M_1$ can serve as a sub-module or not be utilized.

The new main module, such as the storing module $M_2$, communicates with the host device 110 until the new main module, such as the storing module $M_2$, cannot provide the corrected data to the host device 110. When the storing module $M_2$ cannot provide the corrected data to the host device 110, another sub-module, such as the storing module $M_1$ or one of the storing modules $M_3 \sim M_n$, is requested by the storing module $M_2$ to serve as a main module to provide data to the host device 110.

In a conventional storage medium, when a memory cell is abnormal, the memory cell cannot provide data to a host device. However, since the storage medium 120 comprises various storing modules, when the main module is abnormal, another storing module provides data to the host device 110. Thus, the transmittal state between the host device 110 and the storing module 120 can be maintained.

In another embodiment, when the storing module $M_1$ cannot provide correction data to the host device 110, the storing module $M_2$ provides data, which is stored in the storing module $M_2$ to the host device 110 and the storing module $M_1$ updates data, which is stored in the storing module $M_1$ according to the data provided by the storing module $M_2$. Thus, the storing module $M_1$ can serve as a sub-module.

The invention does not limit the kind of the protocol between the storing modules $M_1 \sim M_n$. In this embodiment, the protocol between the storing modules $M_1 \sim M_n$ is an SD protocol. In other embodiment, the protocol between the storing modules $M_1 \sim M_n$ is a protocol, which transmits data via two wires. The protocol may be an inter-integrated circuit (I2C) protocol or a universal asynchronous receiver transmitter (UART) protocol.

Figure 2:
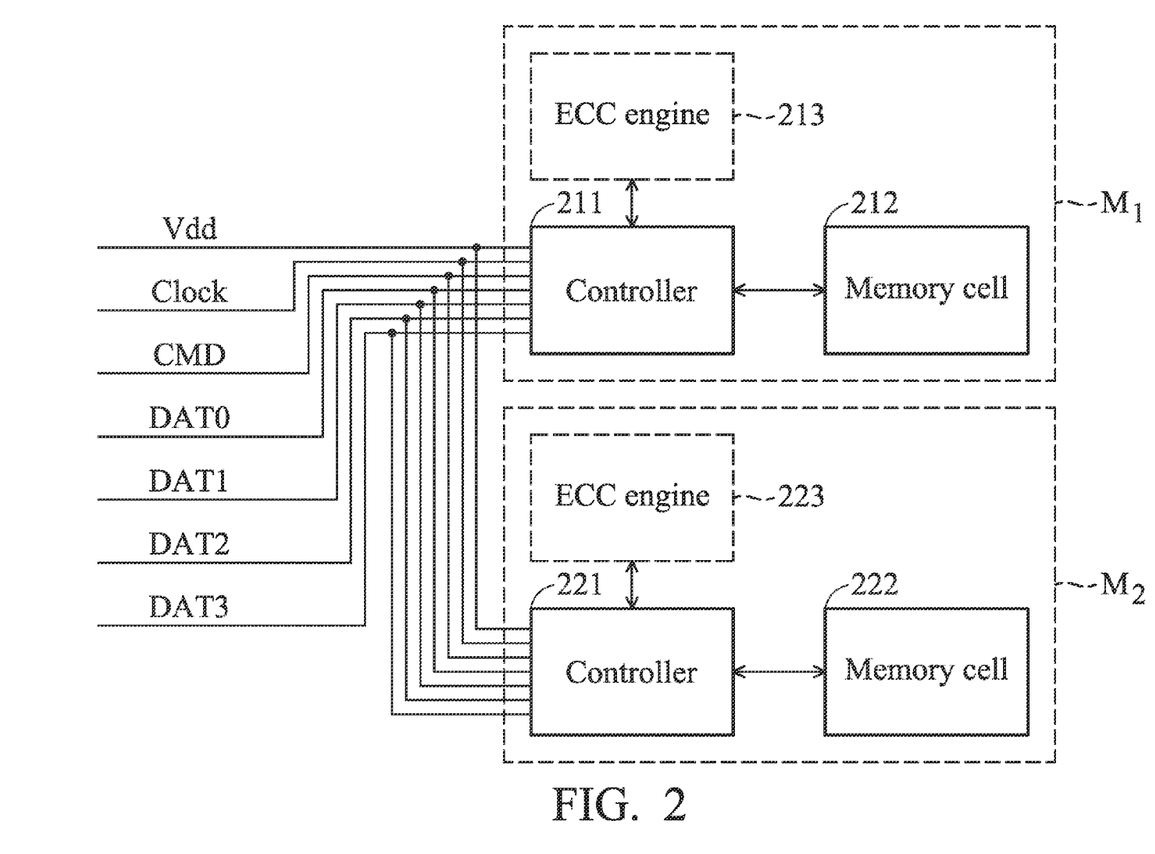
FIG. 2 is a schematic diagram of an exemplary embodiment of a storage medium.

Since the storing modules $M_1 \sim M_n$ comprise the same circuit structures, only the storing modules $M_1$ and $M_2$ are shown in FIG. 2. FIG. 2 is a schematic diagram of an exemplary embodiment of a storage medium. The storing module $M_1$ comprises a controller 211 and a memory cell 212. The storing module $M_2$ comprises a controller 221 and a memory cell 222. The controller 211 accesses the memory cell 212. The controller 221 accesses the memory cell 222. In one embodiment, the memory cells 212 and 222 are independent of NAND flash memories. Thus, the memory cells 212 and 222 are accessed by a single controller.

In this embodiment, the storing module $M_1$ comprises an ECC engine 213 and the storing module $M_2$ comprises an ECC engine 223. The ECC engine 213 corrects the data received by the controller 211. The ECC engine 223 corrects the data received by the controller 221.

Taking the ECC engine 213 as an example, the controller 211 reads data stored in the memory cell 212 to generate an accessing result and provides the accessing result to the ECC engine 213 to correct errors. The ECC engine 213 corrects the accessing result to generate a corrected result and provides the corrected result to the controller 211. In one embodiment, the ECC engine 213 is integrated in the controller 211.

During a read cycle, when the storing module $M_1$ is a main module, the controller 211 reads the memory cell 212 to generate a first accessing result according to address information. The controller 211 utilizes the ECC engine 213 to execute an ECC operation for the first accessing result. When the first accessing result does not have an error or the first accessing result has an error and the error can be corrected, the controller 211 corrects the first accessing result to generate corrected data, serves the corrected data as read data and provides the read data to the host device 110 via the transmittal lines DAT0~DAT3.

However, if the first accessing result has various error bits, the first accessing result cannot be corrected. The storing module $M_1$ requests the storing module $M_2$ to serve as a main module. In this embodiment, the controller 221 reads the memory cell 222 to generate a second accessing result and utilizes the ECC engine 223 to execute an ECC operation for the second accessing result. When the second accessing result does not have an error or the second accessing result has an error and the error can be corrected, the controller 221 corrects the second accessing result to generate corrected data, serves the corrected data as read data and provides the read data to the host device 110 via the transmittal lines DAT0~DAT3.

In another embodiment, when the controller 211 cannot provide correction data to the host device 110, the controller 221 is utilized to provide data to the host device 110 according to address information. The controller 211 stores the data, which is provided by the controller 221, to the memory cell 212 according to the address information. Thus, the storing module $M_1$ may serve as a main module again or serve as a sub-module.

Figure 3:
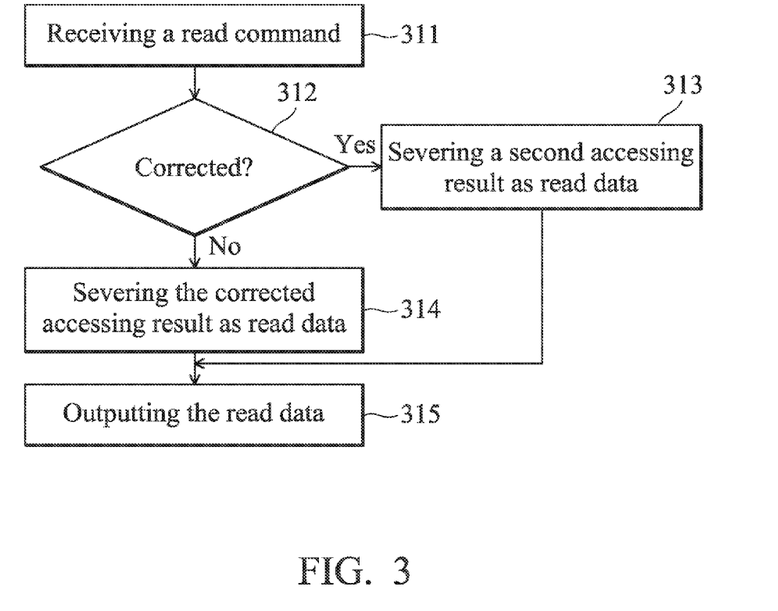
FIGS. 3-6 are flow charts of other exemplary embodiments of an access method.

FIG. 3 is a flow chart of an exemplary embodiment of an access method. The access method is applied to a storage medium. Taking FIG. 2 as an example, the storage medium comprises a first module $M_1$ and a second module $M_2$. The first module $M_1$ comprises a first controller 211 and a first memory cell 212. The second module $M_2$ comprises a second controller 221 and a second memory cell 222. In this embodiment, assume that the first module $M_1$ is a main module and the second module $M_2$ is a sub-module.

First, a read command is received (step 311). In one embodiment, the read command is sent from a host device. In this embodiment, since the first module $M_1$ is a main module, the first controller 211 reads data stored in the first memory cell 212 to generate a first accessing result according to address information of the read command.

It is determined whether the first accessing result has an error and whether the error can be corrected (step 312). When the first accessing result has an error and the error cannot be corrected, the second module $M_2$ is read to generate a second accessing result and the second accessing result serves as read data (step 313). In this embodiment, when the first module $M_1$ cannot provide data, the first controller 211 requests the second controller 221 to read the second memory cell 222. Thus, the second controller 221 reads the second memory cell 222 to generate a second accessing result according to the address information of the read command.

The invention does not limit the kind of the protocol between the first and the second controllers. The first controller 211 communicates with the second controller 221 according to an SD protocol, an I2C protocol or an UART protocol.

When the error of the first accessing result can be corrected, the corrected accessing result serves as read data (step 314). Final, the read data is provided to a host device (step 315). In one embodiment, when the first accessing result has an error and the error cannot be corrected, the second accessing result is stored in the first memory cell according to address information.

Figure 4:
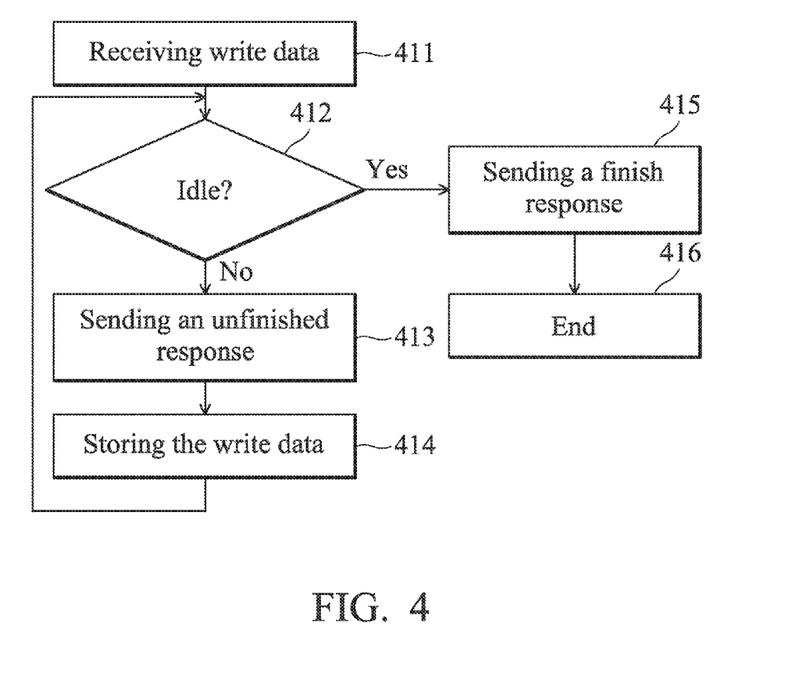

FIG. 4 is a flow chart of another exemplary embodiment of the access method. During a write cycle, write data is received (step 411). In one embodiment, the write data is provided by a host device. Referring to FIG. 2, the write data is stored in the first module $M_1$ and the second module $M_2$.

It is determined whether the first module $M_1$ and the second module $M_2$ are idle (step 412). In this embodiment, since the first module $M_1$ is a main module, the first module $M_1$ determines whether the second module $M_2$ has completed a writing operation, which stores the write data in the memory cell 222. In one embodiment, the first module $M_1$ determines whether the second module $M_2$ has completed the writing operation according to the levels of the transmittal lines DAT1 and DAT2 of an SD protocol.

When the first module $M_1$ and the second module $M_2$ are idle, it represents that each of the first module $M_1$ and the second module $M_2$ has completed the writing operation. Thus, a finish response is sent to the host device (step 415) and the writing operation is ended (step 416). In this embodiment, the first module $M_1$ sends the finish response to the host device. In one embodiment, when the first module $M_1$ and the second module $M_2$ complete the writing operation, the first module $M_1$ sets the level of the transmittal line DAT0 to a high level.

When the first module $M_1$ or the second module $M_2$ is not idle, it represents that one of the first module $M_1$ and the second module $M_2$ has not completed the writing operation. Thus, an unfinished response is sent to the host device (step 413). In this embodiment, when one of the first module $M_1$ or the second module $M_2$ has not completed the writing operation, the first module $M_1$ sets the level of the transmittal line DAT0 to a low level and the first module $M_1$ or the second module $M_2$ continuously stores the write data (step 414).

Figure 5:
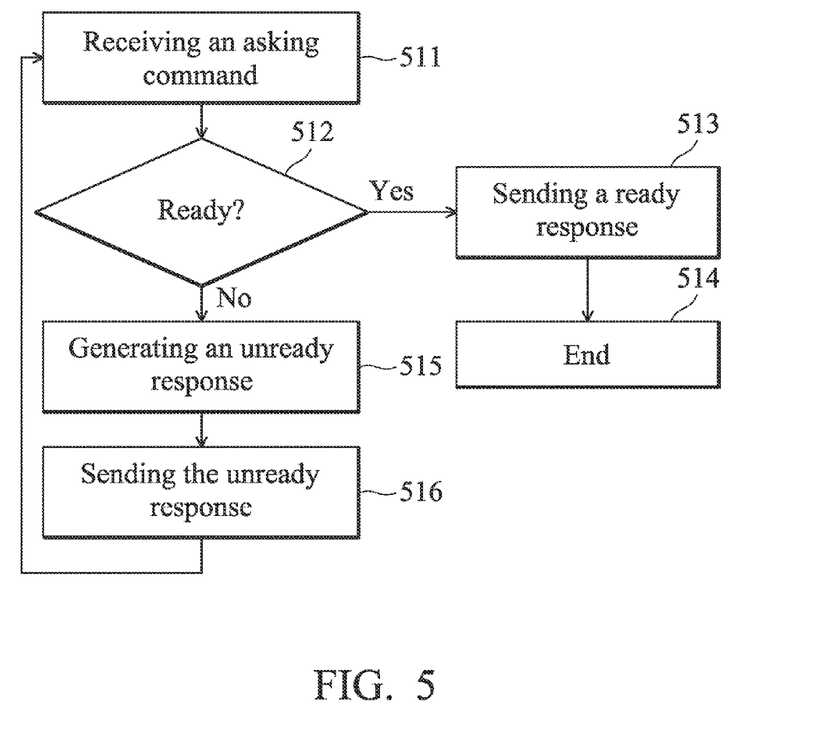

FIG. 5 is a flowchart of another exemplary embodiment of an access method. First, an asking command is received (step 511). In this embodiment, a host device sends the asking command. Before executing a writing operation and a read operation, the host device sends an asking command to a storage medium.

It is determined whether the storage medium is ready (step 512). In this embodiment, the first module $M_1$ serves as a main module such that the first module $M_1$ determines whether the module $M_2$ is ready via the transmittal lines DAT1 and DAT2. In one embodiment, the first module $M_1$ comprises an operating conditions register (OCR). The OCR has a busy bit, which is referred to as a card power-up status bit. When the busy bit is 1, it represents that the first module $M_1$ and the second module $M_2$ are ready. When the busy bit is 0, it represents that the first module $M_1$ or the second module $M_2$ is not ready. After all modules are ready, the first module $M_1$ sets the busy bit to 1. The host device reads the busy bit of the OCR of the first module $M_1$ to determine whether the first module $M_1$ and the second module $M_2$ are ready.

When the first module $M_1$ and the second module $M_2$ are ready, a ready response is sent to the host device (step 513) and the initiate operation is ended (step 514). In this embodiment, the ready response sets the busy bit of the OCR to 1. In another embodiment, the first module $M_1$ communicates with the second module $M_2$ via the transmittal lines DAT1 and DAT2.

When the first module $M_1$ or the second module $M_2$ is not ready, an unready response is generated (step 515) and sent to the host device (step 516). In this embodiment, step 515 sets the busy bit of the OCR of the first module $M_1$ to 0, and step 516 provides all bit statuses of the OCR to the host device. The host device determines that the first module $M_1$ or the second module $M_2$ is not ready according to the busy bit of the OCR and sends an asking command to the storage medium until the first module $M_1$ and the second module $M_2$ are ready.

Figure 6:
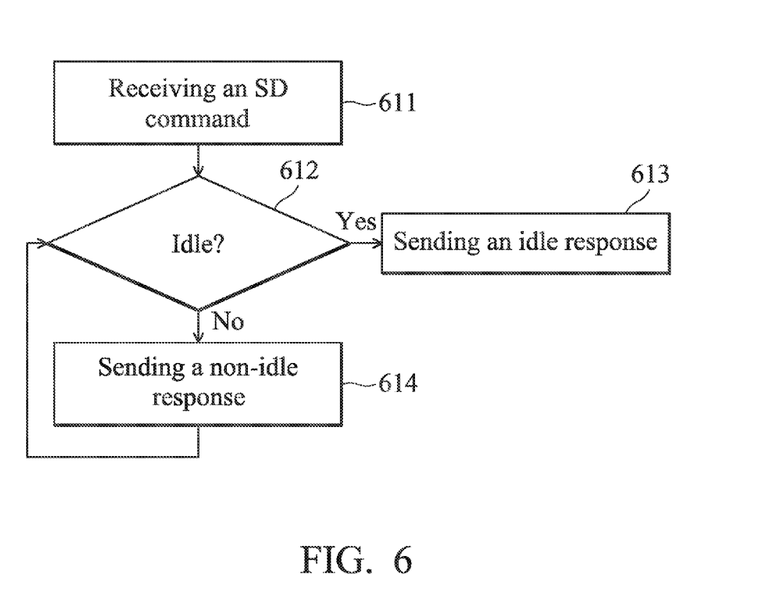

FIG. 6 is a flowchart of an exemplary embodiment of an access method. In this embodiment, assuming that the storage medium is an SD card. First, an SD command is received (step 611). In other embodiments, a host device sends a corresponding command to initial the storage medium according to the kind of the storage medium.

Next, it is determined whether the storage medium is idle (step 612). In this embodiment, the first module $M_1$ determines whether the second module $M_2$ is idle via the transmittal lines DAT1 and DAT2. When the first module $M_1$ and the second module $M_2$ are idle, an idle response is sent to the host device (step 613). In one embodiment, the first module $M_1$ sets the level of the transmittal line DAT0 to an idle level, such as a high level. The host device determines that the storage medium is idle according to the level of the transmittal line DAT0.

When the first module $M_1$ or the second module $M_2$ is not idle, a non-idle response is sent to the host device (step 614) and step 612 is executed to determine whether the first module $M_1$ and the second module $M_2$ are ready. In this embodiment, the first module $M_1$ sets the level of the transmittal line DAT0 to a busy level, such as a low level.

Since the storage medium comprises a plurality of storing modules and each storing module stores the same data, when a host device desires to access the storage medium, a main storing module among the storing modules communicates with the host device and the other storing modules. The main storing module stores data and provides a portion of the data to the host device. When the main storing module provides the data to the host device, if the data has many incorrect bits and the main storing module cannot correct the incorrect bits, another storing module is selected to communicate with the host device. Thus, the host device can normally execute an accessing operation.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A storage medium receiving write data provided by a host device and providing read data to the host, comprising:
    a first module comprising:
    a first memory cell storing the write data;
    a first controller reading the first memory cell to generate a first accessing result; and
    a second module comprising:
    a second memory cell storing the write data; and
    a second controller reading the second memory cell,
    wherein when the first accessing result has an error and the error cannot be corrected by the first controller, the first controller requests the second controller to read the second memory cell to generate a second accessing result, and the second controller serves the second accessing result as the read data and provides the read data to the host; and
    wherein after the second controller has written the write data to the second memory cell, the first controller sends a response signal to the host device.

2. The storage medium as claimed in claim 1, wherein when the error can be corrected by the first controller, the first controller corrects the first accessing data to generate corrected data and serves the corrected data as the read data.

3. The storage medium as claimed in claim 1, wherein when the error cannot be corrected, the second controller reads the second memory cell according to address information to generate the second accessing result, and the first controller stores the second accessing result to the first memory cell according to the address information.

4. The storage medium as claimed in claim 1, wherein during a write cycle, the first and the second controllers write the write data to the first and the second memory cells respectively and the first controller confirms whether the second controller has written the write data to the second memory cell.

5. The storage medium as claimed in claim 1, wherein the first controller communicates with the second controller according to a secure digital (SD) protocol, an inter-integrated circuit (I2C) protocol or an universal asynchronous receiver transmitter (UART) protocol.

6. An access system comprising:
    a host device providing write data or receiving read data; and
    a storage medium communicating with the host device and comprising:
    a first module comprising:
    a first memory cell storing the write data; and
    a first controller reading the first memory cell to generate a first accessing result; and
    a second module comprising:
    a second memory cell storing the write data; and
    a second controller reading the second memory cell,
    wherein when the first accessing result has an error and the error cannot be corrected by the first controller, the first controller requests the second controller to read the second memory cell to generate a second accessing result, and the second controller serves the second accessing result as the read data and provides the read data to the host device; and
    wherein after the second controller has written the write data to the second memory cell, the first controller sends a response signal to the host device.

7. The access system as claimed in claim 6, wherein when the error can be corrected by the first controller, the first controller corrects the first controller to generate corrected data and serves the corrected data as the read data.

8. The access system as claimed in claim 6, wherein when the error cannot be corrected, the second controller reads the second memory cell according to address information to generate the second accessing result, and the first controller stores the second accessing result to the first memory cell according to the address information.

9. The access system as claimed in claim 6, wherein during a write cycle, the first and the second controllers write the write data to the first and the second memory cells and the first controller confirms whether the second controller has written the write data to the second memory cell.

10. The access system as claimed in claim 6, wherein the first controller communicates with the second controller according to a secure digital (SD) protocol, an inter-integrated circuit (I2C) protocol or an universal asynchronous receiver transmitter (UART) protocol.

11. An access method for a storage medium comprising a first module and a second module, wherein the first module comprises a first controller and a first memory cell, and the second module comprises a second controller and a second memory cell, comprising:
    activating the first controller to receive a read command;
    reading the first memory cell to generate a first accessing result according to the read command;
    requesting the second controller to read the second memory cell to generate a second accessing result and serving the second accessing result as read data when the first accessing result has an error and the error cannot be corrected; and providing the read data to a host device, wherein after the second controller has written write data to the second memory cell, the first controller sends a response signal to the host device.

12. The access method as claimed in claim 11, further comprising:

correcting the first accessing result to generate corrected data and serving the corrected data as the read data when the error can be corrected.

13. The access method as claimed in claim 11, further comprising:

reading the second memory cell to generate the second accessing result according to address information.

14. The access method as claimed in claim 11, further comprising:

storing the second accessing result to the first memory cell according to the address information when the error cannot be corrected.

15. The access method as claimed in claim 11, wherein the step of requesting the second controller to read the second memory cell is executed by the first controller.

16. The access method as claimed in claim 15, wherein the first controller communicates with the second controller according to a secure digital (SD) protocol, an inter-integrated circuit (I2C) protocol or an universal asynchronous receiver transmitter (UART) protocol.

\* \* \* \* \*